US006863140B2

(12) United States Patent
Noreikat et al.

(10) Patent No.: US 6,863,140 B2
(45) Date of Patent: Mar. 8, 2005

(54) MOTOR VEHICLE DRIVE ARRANGEMENT

(75) Inventors: Karl-Ernst Noreikat, Esslingen (DE); Tobias Ostertag, Burgstetten (DE); Lars Saroch, Hainichen (DE)

(73) Assignee: DaimlerChrysler AG, Stuttgart (DE)

( * ) Notice: Subject to any disclaimer, the term of this patent is extended or adjusted under 35 U.S.C. 154(b) by 105 days.

(21) Appl. No.: 10/314,422

(22) Filed: Dec. 9, 2002

(65) Prior Publication Data

US 2003/0127262 A1 Jul. 10, 2003

(30) Foreign Application Priority Data

Dec. 8, 2001 (DE) .......................................... 101 60 466

(51) Int. Cl.[7] ................................................. B60K 1/00
(52) U.S. Cl. ........................................ 180/65.2; 475/5
(58) Field of Search ............................. 180/65.2, 65.3, 180/65.4, 65.6, 306; 475/5; 192/3.25, 3.28, 3.29

(56) References Cited

U.S. PATENT DOCUMENTS

| | | | | |
|---|---|---|---|---|
| 5,427,196 A | * | 6/1995 | Yamaguchi et al. ....... 180/65.2 |
| 5,931,757 A | * | 8/1999 | Schmidt ........................ 475/2 |
| 6,022,287 A | * | 2/2000 | Klemen et al. ................ 475/5 |
| 6,258,001 B1 | * | 7/2001 | Wakuta et al. ................ 475/5 |
| 6,340,339 B1 | * | 1/2002 | Tabata et al. .................. 475/5 |
| 6,358,173 B1 | * | 3/2002 | Klemen et al. ................ 475/5 |
| 6,478,101 B1 | * | 11/2002 | Taniguchi et al. ......... 180/65.2 |
| 6,592,486 B1 | * | 7/2003 | Arbanas et al. ............... 475/84 |
| 6,698,562 B2 | * | 3/2004 | Teraoka et al. ............... 192/35 |

FOREIGN PATENT DOCUMENTS

| | | |
|---|---|---|
| DE | 2436546 A1 | 2/1976 |
| DE | 4005623 A1 | 8/1991 |
| DE | 4004330 C2 | 1/1994 |
| DE | 4342233 A1 | 6/1994 |
| DE | 19810374 A1 | 9/1999 |
| DE | 69510897 T2 | 11/1999 |
| DE | 19917665 A1 | 10/2000 |
| DE | 19923316 A1 | 11/2000 |
| DE | 10012385 A1 | 9/2001 |

* cited by examiner

Primary Examiner—Christopher P. Ellis
Assistant Examiner—Christopher Bottorff
(74) Attorney, Agent, or Firm—Crowell & Moring LLP

(57) ABSTRACT

A motor vehicle drive arrangement has a locomotive drive train and at least one liquid pump capable of being driven by the latter. During a standstill in rotation or during very slow rotation of the locomotive drive train, the pump is capable of being driven by an electric motor instead of by the locomotive drive train. Beyond a defined minimum rotational speed of the locomotive drive train, the liquid pump is capable of being driven by the latter instead of by the electric motor. At least one free-wheel is provided for this purpose.

22 Claims, 2 Drawing Sheets

MOTOR VEHICLE DRIVE ARRANGEMENT

MOTOR VEHICLE DRIVE ARRANGEMENT

This application claims the priority of German application 101 60 466.1, filed Dec. 8, 2001, the disclosure of which is expressly incorporated by reference herein.

BACKGROUND AND SUMMARY OF THE INVENTION

The present invention relates to a motor vehicle drive arrangement including a locomotive drive train for transmission of drive torque from a locomotive drive engine to a locomotive drive transmission, at least one liquid pump for supplying at least one drive part with operating liquid, and a first pump drive connection from a rotary part of the locomotive drive train to the liquid pump. The rotary part of the locomotive drive train is a drive shaft which is drive-connected or drive-connectable to the locomotive drive transmission. Such an arrangement also includes an electrical machine capable of being operated as an electric motor and having a rotor which is drive-connected or drive-connectable to the liquid pump by way of a second pump drive connection, a first free-wheel in the first pump drive connection, the liquid pump being capable of being driven by the electric motor by way of the second pump drive connection more rapidly than by the rotary part of the locomotive drive train, without the rotary part being passively taken up, and a second free-wheel in the second pump drive connection, so that the liquid pump can be driven more rapidly by the rotary part than by the electric motor, without the rotor of the electric motor being passively taken up.

Accordingly, the invention relates to a motor vehicle drive arrangement having a locomotive drive train for transmission of drive torque from a locomotive drive engine to a locomotive drive transmission, at least one liquid pump for supplying at least one drive part with operating liquid, and a first pump drive connection from a rotary part of the locomotive drive train to the liquid pump.

A motor vehicle drive arrangement of this type is known from German publication DE 198 10 374 A1. In this arrangement, an oil pump is drive-connected or drive-connectable to an electrical machine via a first free-wheel and to an electric motor via a further free-wheel. The electrical machine is connected to the locomotive drive train via a planetary transmission and is capable of being operated as a starter for driving an internal combustion engine of the locomotive drive train and for the generation of torque in addition to the internal combustion engine. German publication DE 199 23 316 A1 shows free-wheels, arranged coaxially to an engine drive shaft, for starting an internal combustion engine and for driving an oil pump by means of an electrical machine. The oil pump is also capable of being driven by the locomotive drive train by means of a centrifugal clutch. German publication DE 100 12 385 A1 shows a liquid pump coaxial to a transmission drive shaft. German publication DE 695 10 897 T2 shows an electrical machine coaxial about a transmission shaft. Technological background information is also given in DE 199 17 665 A1 and German publications DE 43 42 233 A1.

In view of increasing requirements for the reduction of consumption and emission, in the future, it will no longer be possible to dispense with a start/stop operation of the internal combustion engine during brief interruptions in the travel of the motor vehicle, in particular at traffic-light intersections.

In order to achieve a rapid and yet comfortable starting of the internal combustion engine, starter/alternator units and various hybrid systems suitable for this purpose are being developed. Hybrid drives for motor vehicles are shown, for example, in German publication DE 40 04 330 C2, German laid-open publication DE 24 36 546 and German publication DE 40 05 623 A1.

The transmissions and, depending on the design, also locomotive drive clutches outside the transmission require, for lubrication and/or for their actuation, operating liquid which is generally designated as oil, even when this is often no longer oil nowadays. Accordingly, the liquid pumps necessary for this purpose are conventionally designated as oil pumps. The liquid pump or oil pump of an automatic transmission (automatically shiftable transmission) is driven, in the series production situation, via the pump impellor of a hydrodynamic torque converter. This pump impellor, in the series production situation, is coupled to the crankshaft of the internal combustion engine. Consequently, with the internal combustion engine switched off, the transmission-oil pressure (for shifting and lubrication of multiple-disc clutches or other clutches in the automatic transmission and/or of one or more shiftable clutches preceding the latter) cannot be maintained. This presents problems during the start/stop operation of the internal combustion engine, since a rapid "drive-on" of the vehicle is not possible. It is necessary here, for the vehicle to drive on, to wait until the transmission-oil system is filled after the start of the internal combustion engine and a sufficiently high pressure level for shifting the clutches of the clutch system has been established in the transmission-oil system. This is in contradiction to the desire for a rapid drive-on of the motor vehicle, for example after a stop and a subsequent start at a road intersection (demand for comfort), and consequently, in the event of start/stop operation, the oil supply has to be maintained by means of an additional external oil pump. This additional external oil pump conventionally consists of a pump and of an electrical drive machine and, because of the large amount of space which it requires, can hardly be accommodated in present-day motor vehicles.

Efforts to integrate hybrid systems in the locomotive drive train and/or to replace the hydrodynamic torque converter of the automatic transmission by the hybrid system lead to the same set of problems which are that no transmission-oil pressure or insufficient transmission-oil pressure can be generated when the transmission input shaft, which may serve for driving the oil pump, is stationary or is running at only a low rotational speed. Thus, even where hybrid systems are concerned, there is still the demand for an additional oil supply of the automatic transmission in specific operating situations, particularly during start/stop operation. Start/stop operation is desirable for energy saving not only at traffic-light intersections, but also in the case of buses at bus stops.

The problem that there is not sufficient transmission oil and/or not a sufficient transmission-oil pressure or pressure for main clutches of the motor vehicle in order to start the motor vehicle quickly arises not only in the case of vehicle drives of an internal combustion engine, but also in the case of vehicle drives which have another locomotive drive engine instead of an internal combustion engine, for example an electric motor which, for example, is supplied with electrical energy by a fuel cell. Here, too, for shifting a main clutch of the vehicle drive train and/or shift clutches and shift brakes in an automatically shiftable automatic transmission, it is necessary to have sufficient operating liquid, for example oil, and a sufficient liquid pressure in the transmission or the clutches and their control lines, where appropriate even during or before the starting of the motor vehicle.

One object of this invention is to provide in a simple and cost-effective way, and while taking up only a small amount of construction space, a solution in which, as far as possible simultaneously with the desire to start a motor vehicle, there is the operating-liquid pressure necessary for this purpose.

This object is achieved, according to the invention, by providing an electrical machine capable of being operated as an electric motor, having a rotor which is drive-connected or drive-connectable to the liquid pump by means of a second pump drive connection, and providing a first free-wheel in the first pump drive connection, the liquid pump being capable of being driven by the electric motor by means of the second pump drive connection more rapidly than by the rotary part of the locomotive drive train, without this rotary part being passively taken up. The first free-wheel surrounds the drive shaft coaxially and has a free-wheel part connected fixedly in terms of rotation to the latter, a hollow intermediate shaft, through which the drive shaft extends axially, is provided, each of a further free-wheel part of the first free-wheel and a free-wheel part of the second free-wheel is connected fixedly in terms of rotation to the intermediate shaft, and a further free-wheel part of the second free-wheel is connected fixedly in terms of rotation to the rotor of the electric motor. According to a free-wheel principle, each of the free-wheel parts free-wheel drives the other in one direction of relative rotation and does not drive the other in an opposite direction of relative rotation.

Further features of the invention are reflected in dependent claims.

The invention has the advantage that the full operating-liquid pressure is already present in the drive system during the start of a motor vehicle or in fractions of seconds thereafter. A further advantage of the invention is that, to achieve the object, a pump already present even in series production vehicles with an automatic transmission can continue to be used and can be used at the same point as hitherto and is sufficient as the sole pump, in that the latter can, if required, be driven electrically, irrespective of the operating state of the locomotive drive engine.

This means that only a single pump is required, which can be operated selectively by the locomotive drive engine (internal combustion engine or electric motor or other type of engine) or by an additional electrical machine which can be operated as an electric motor. This additional electrical machine may, if desired, be used as a generator for current generation, for example as a brake generator, at operating times when it is not required as an electric motor. Since the pump already present in series production vehicles can be used, it can, for example, continue to remain accommodated in a torque converter bell of an automatic transmission where it is already arranged even in known motor vehicles which do not have an additional electrical machine as an alternative drive for the oil pump. Furthermore, according to the invention, the external oil pump necessary hitherto in conjunction with start/stop operation or in the case of hybrid drive systems is not needed.

This means that, whenever the rotational speed of the transmission input shaft is too low in start/stop systems, the liquid pump (oil pump) can be operated by means of the electrical machine additionally integrated in the transmission case. This takes place, in the invention, via at least one free-wheel or, according to a preferred embodiment, via two free-wheels in the pump drive. As soon as the internal combustion engine or the transmission input shaft (which can be driveable by the internal combustion engine or by a hybrid system) rotates more rapidly than the additional electrical machine, the liquid pump can be operated by the transmission input shaft. When the transmission input shaft is at a standstill or is running at a low rotational speed, the electrical machine can, as an electric motor, drive the pump, without torque being transmitted to the transmission input shaft (and a converter or the locomotive drive transmission). The liquid-pressure supply of the automatic transmission is thus always ensured even when the rotational speed of the converter or of the transmission input shaft is not sufficiently high.

The invention is described below by means of preferred embodiments as examples, and with reference to the drawings.

DETAILED DESCRIPTION OF THE INVENTION

Figure 2:
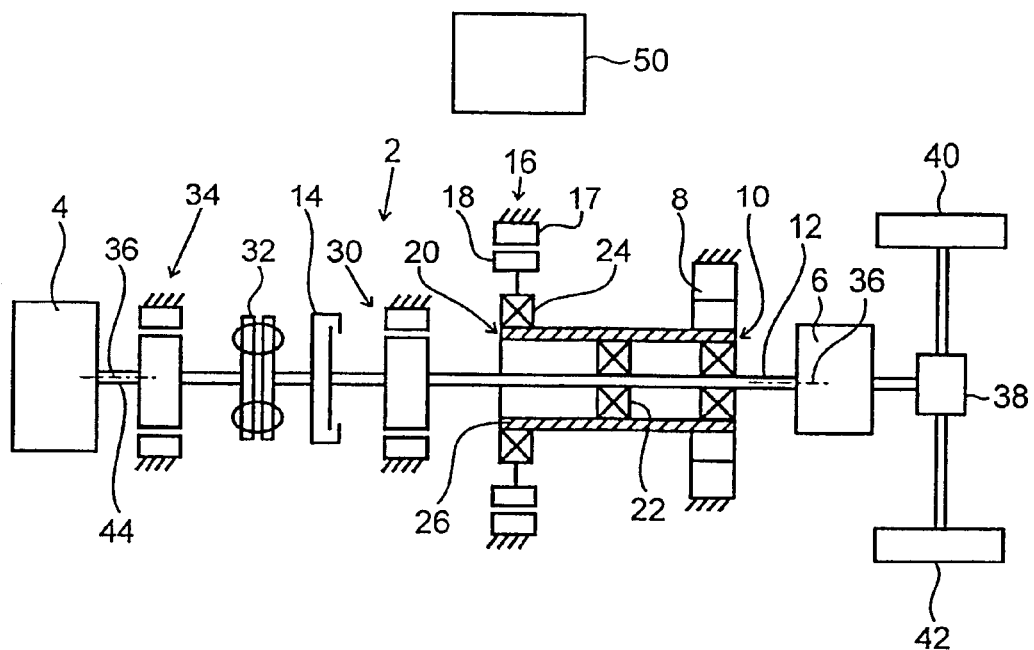
FIG. 2 is a diagrammatic illustration, not true to scale, of the drive arrangement of FIG. 1.

As is evident particularly from FIG. 2, the motor vehicle drive arrangement contains a locomotive drive train 2 for transmission of drive torque from a locomotive drive engine 4 to a locomotive drive transmission 6. Furthermore, a liquid pump 8 (oil pump) for supplying at least one drive part with operating liquid and a first pump drive connection 10 from a rotary part 12 of the locomotive drive train 2 to the liquid pump 8 are provided. In the embodiment shown, the rotary part 12 of the locomotive drive train 2 is the transmission input shaft of the locomotive drive transmission 6 which is preferably an automatic transmission with automatically shiftable gears. It can be used with or without a preceding torque converter. According to another embodiment, the locomotive drive transmission 6 could also be a manually shiftable transmission.

According to the drawings, the rotary part 12 is preferably the transmission input shaft to the locomotive drive transmission. It could, however, also be another shaft or a gearwheel or a clutch element of the locomotive drive train 2. The rotary part 12 may be arranged after the locomotive drive transmission 6, but, according to the drawings, it is preferably arranged in front of it, so that the transmission step-up and the rotational speed, higher than that of the vehicle wheels, of the locomotive drive engine 4 can be utilized for the liquid pump 8.

The drive part, which is to be supplied with operating liquid by the liquid pump 8, is, in particular, the locomotive drive transmission 6 and in the latter, in particular, shift clutches and shift brakes, present if appropriate, which are supplied by the liquid pump 8 with liquid (in particular, oil) for actuation and/or lubrication. Furthermore, this drive part may also include bearings and gearwheels and other clutches of the locomotive drive transmission 6 which are lubricated and/or cooled by the liquid of the liquid pump 8. Moreover, a drive part which is supplied by the pump 8 with liquid for actuation, lubrication and/or cooling may be a main clutch 14 which is arranged in the locomotive drive train 2 between the locomotive drive engine 4 and the locomotive drive transmission 6 and, depending on the type of vehicle, can be opened and closed manually or automatically.

A first electrical machine 16 capable of being operated as an electric motor contains a stator 17 and a rotor 18. The rotor 18 is drive-connected or drive-connectable to the liquid pump 8 by means of a second pump drive connection 20. There is a first free-wheel 22 in the first pump drive connection 10, so that the liquid pump 8 can be driven by the electric motor 16 by means of the second pump drive connection 20 more rapidly than by the rotary part 12 (transmission input shaft), without this rotary part 12 being passively taken up.

According to a preferred embodiment, there is a second free-wheel 24 in the second pump drive connection 20, too, so that the liquid pump 8 can be driven more rapidly by the first pump drive connection 10 than by the electric motor 16, without the rotor 18 of the latter being passively taken up.

The pump 8 can thus be driven alternatively by the drive part 12 of the locomotive drive train 2 or by the electric motor 16, depending on which has the higher rotational speed of the free-wheels 22 and 24. In each of these two instances, the inactive part, namely the drive part 12 or rotor 18, is prevented from being passively taken up.

Preferably, the first free-wheel 22 is not arranged so as to be radially offset to the transmission input shaft 12, but, instead, surrounds the latter coaxially, its radially inner free-wheel part being connected fixedly in terms of rotation to the said shaft 12. Less space for the free-wheel is consequently required.

Moreover, there is a saving in the amount of space required when, according to the preferred exemplary embodiment, the liquid pump 8, preferably what may be referred to as a crescent pump, is arranged so as likewise to surround the rotary part 12.

Space is saved in a similar way when the second free-wheel 24 and the first electrical machine 16 capable of being operated as an electric motor are not arranged axially parallel to the transmission input shaft 12, but surround the latter coaxially.

Figure 1:
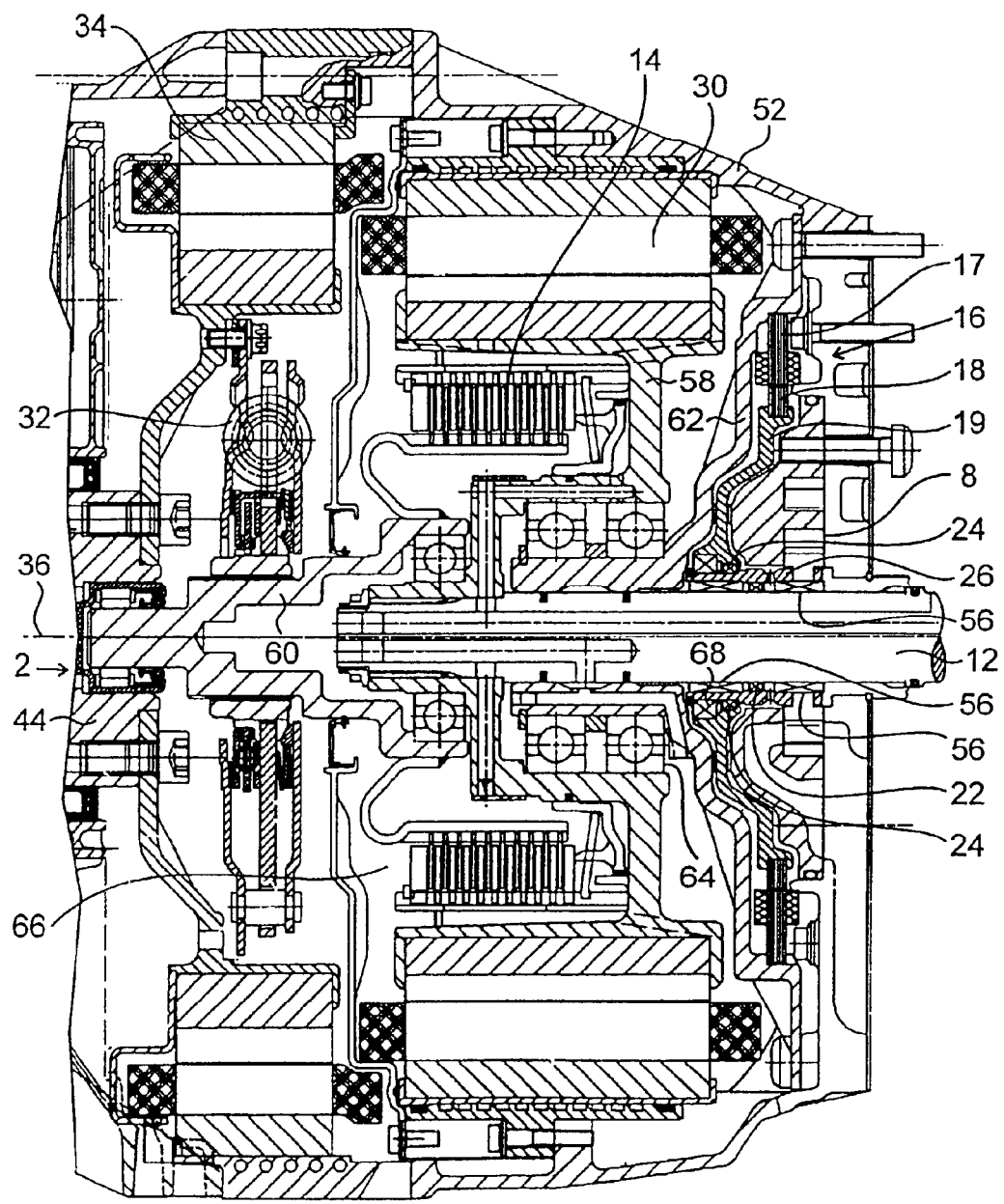
FIG. 1 shows a truncated axial section of a motor vehicle drive arrangement according to the invention.

To achieve as high a torque as possible, along with a small configuration of the first electrical machine 16, the latter has as large a diameter as possible. This aim and, in addition, a particularly low space requirement are achieved when this electrical machine 16 is arranged so as at least partially to overlap the radially outer region of the liquid pump 8 axially, as shown in FIG. 1.

As the drawings show, the two pump drive connections 10 and 20 have a common connecting portion 26 from their free-wheels 22 and 24 to the liquid pump 8, in order to obtain a saving in terms of structural elements and component space. This common connecting portion 26 is formed preferably by a hollow intermediate shaft 26, through which the rotary part 12 (transmission input shaft) extends axially. The intermediate shaft 26 is connected fixedly in terms of rotation to a free-wheel part of each of the two free-wheels 22 and 24. A particularly small construction space is achieved when, according to the drawings, the first free-wheel 22 is arranged on the inner circumference of the second free-wheel 24 on the outer circumference and the intermediate shaft 26 and the free-wheel parts contiguous thereto are in each case connected to it fixedly in terms of rotation.

The invention can also be used in hybrid drives. The latter may be formed, for example, in that, according to the drawings, the drive train 2 contains, in addition to the locomotive drive engine designed as an internal combustion engine 4, at least one electrical machine 30 (or two or more) for driving the rotary part 12 (here, the transmission input shaft), in order to introduce into the drive train drive energy for driving the motor vehicle. The electrical machine 30 may be arranged axially parallel or, according to the drawings, preferably coaxially to the center line 36 of the rotary part 12, preferably in the drive connection between the main clutch 14 and the rotary part 12. The electrical machine 30 is preferably arranged coaxially around the rotary part 12.

For drive-on or for an instantaneous increase in power, the electrical machine 30 of the locomotive drive train 2 may be operated, in addition to the internal combustion engine 4, as an electric motor or as a generator for current generation.

A torsional-vibration damper 32 may be arranged between the main drive engine 4 or internal combustion engine 4 and the main clutch 14. Furthermore, in the same portion of the drive train 2 or between the internal combustion engine 4 and the vibration damper 32, a further electrical machine 34 may be arranged in the drive train 2, either radially offset to the latter or preferably coaxially to the centre line 36 of the rotary part 12 (here, the transmission input shaft).

According to the preferred embodiment of the invention, all the drive parts are arranged coaxially to a common center line 36.

The output of the locomotive drive transmission 6 drives vehicle wheels 40 and 42, for example via a differential mechanism 38.

A drive-train input shaft 44 between the locomotive drive engine 4 and the vibration damper 32 or, if there is no vibration damper 32, between the locomotive drive engine 4 and the main clutch 14 may be formed by an intermediate shaft or directly by the crankshaft of the locomotive drive engine 4 designed as an internal combustion engine.

A control device 50 is provided, which may be part of an electronic engine management system and/or of an electronic transmission management system and by means of which, when the rotary part 12 is at a standstill or is rotating slowly, either as a result of the standstill or crawling of the motor vehicle, the electric motor 16 for driving the liquid pump 8 is switched on automatically before or at the latest simultaneously with the starting of the locomotive drive engine 4, for the supply of liquid to the at least one drive part 6 and/or 14, that is to say the locomotive drive transmission 6 and/or the main clutch 14.

The standstill or crawling of the motor vehicle can be detected or calculated by means of sensors and/or by means of the electronic management system of the motor vehicle and be utilized by the control device 50.

FIG. 1 shows a preferred embodiment in a real illustration of the drive arrangement of FIG. 2. This reveals, in particular, the advantage that the liquid pump (oil pump), for example what may be referred to as the crescent pump, which is also used in existing series production vehicles can be used as the liquid pump 8, specifically at the same point as in existing series production vehicles, and that the electrical machine 16 capable of being operated as an electric motor takes up only a very small amount of construction space and can therefore be accommodated in the same way as the liquid pump 8, for example, in the converter bell 52 of the hydrodynamic torque converter of automatic transmissions 6 which is used in series production vehicles. The rotor and stator 17, 18 may have a large diameter and therefore, even with low power and a small form of construction, can generate a high torque for driving the liquid pump 8. The rotor 18 is connected via a rotor carrier 19 to the second free-wheel 20 which is arranged on the outer circumference of the intermediate shaft 26. The first free-wheel 22 is arranged in the radial interspace between the intermediate shaft 26 and the transmission input shaft 12.

Preferably, the intermediate shaft 26 is mounted by means of one or more bearings 56 on the transmission input shaft 12 so as to be rotatable relative to the latter. The rotor 18 or its rotor carrier 19 is mounted on the intermediate shaft 26 preferably by means of a bearing 68.

FIG. 1 shows, furthermore, the input shaft 36 of the locomotive drive train, which input shaft may be the crankshaft of the locomotive drive engine 4 designed as an internal combustion engine. Furthermore, FIG. 1 shows the second electrical machine 34, drive-connected to the crankshaft 2, and the torsional-vibration damper 32, likewise drive-connected to the crankshaft 36.

Furthermore, FIG. 1 shows the main clutch 14 and the first electrical machine 30 of the locomotive drive train 2, the said main clutch and the said first electrical machine both being connected fixedly in terms of rotation to the transmission input shaft 12 via a rotor carrier 58. The other part of the main clutch 14, to be precise its primary part, is drive-connected via a further intermediate shaft 60 to the torsional-vibration damper 32 and via the latter to the crankshaft 44.

The second electrical machine 34 of the locomotive drive train 2 may serve, particularly when the main clutch 14 is open, as a starter motor for starting the internal combustion engine 4. According to the preferred embodiment, all the electrical machines 30 and 34 of the locomotive drive train 2 may alternatively be operated as an electric motor or as a generator for current generation.

The liquid pump 8 is located axially on the outside of (behind) a housing transverse wall 62 which is designed as a bearing carrier for a bearing arrangement 64 of the rotor of the electrical machine 30 of the drive train 2 and which delimits an oil space 66, in which the main clutch 14 and this electrical machine 30 of the drive train 2 are located. The electrical machines 8, 30 and/or 34 may be external rotors, but are preferably internal rotors according to the drawings.

Figure 3:
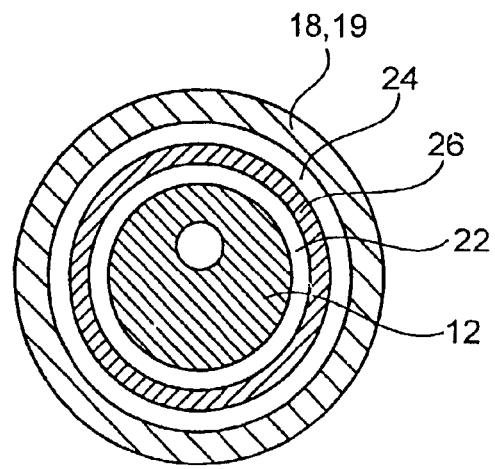
FIG. 3 is a diagrammatic, and not true to scale, cross-sectional view of parts of a pump drive train of the liquid pump.

FIG. 3 shows, not true to scale, a cross section of the free-wheel arrangement with the two free-wheels 22 and 24 and the intermediate shaft 26.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A motor vehicle drive arrangement, comprising:
   a locomotive drive train for transmission of drive torque from a locomotive drive engine to a locomotive drive transmission;
   at least one liquid pump for supplying at least one drive part with operating liquid;
   a first pump drive connection from a rotary part of the locomotive drive train to the liquid pump, the rotary part of the locomotive drive train being a drive shaft which is drive-connected or drive-connectable to the locomotive drive transmission;
   an electrical machine capable of being operated as an electric motor, having a rotor which is drive-connected or drive-connectable to the liquid pump by way of a second pump drive connection, and arranged so as at least partially to overlap the liquid pump;
   a first free-wheel in the first pump drive connection, the liquid pump being capable of being driven by the electric motor by way of the second pump drive connection more rapidly than by the rotary part of the locomotive drive train, without the rotary part being passively taken up;
   a second free-wheel in the second pump drive connection, so that the liquid pump can be driven more rapidly by the rotary part than by the electric motor, without the rotor of the electric motor being passively taken up;
   wherein the first free-wheel surrounds the drive shaft coaxially and has a free-wheel part connected fixedly in terms of rotation to the latter;
   wherein a hollow intermediate shaft, through which the drive shaft extends axially, is provided;
   wherein each of a further free-wheel part of the first free-wheel and a free-wheel part of the second free-wheel is connected fixedly in terms of rotation to the intermediate shaft, and
   wherein a further free-wheel part of the second free-wheel is connected fixedly in terms of rotation to the rotor of the electric motor so that, according to a free-wheel principle, each of the free-wheel parts free-wheel drives the other in one direction of relative rotation and does not drive the other in an opposite direction of relative rotation.

2. A motor vehicle drive arrangement, comprising:
   a locomotive drive train for transmission of drive torque from a locomotive drive engine to a locomotive drive transmission;
   at least one liquid pump for supplying at least one drive part with operating liquid;
   a first pump drive connection from a rotary part of the locomotive drive train to the liquid pump, the rotary part of the locomotive drive train being a drive shaft which is drive-connected or drive-connectable to the locomotive drive transmission;
   an electrical machine capable of being operated as an electric motor and having a rotor which is drive-connected or drive-connectable to the liquid pump by way of a second pump drive connection;
   a first free-wheel in the first pump drive connection, the liquid pump being capable of being driven by the electric motor by way of the second pump drive connection more rapidly than by the rotary part of the locomotive drive train, without the rotary part being passively taken up;
   a second free-wheel in the second pump drive connection, so that the liquid pump can be driven more rapidly by the rotary part than by the electric motor, without the rotor of the electric motor being passively taken up;
   wherein the first free-wheel surrounds the drive shaft coaxially and has a free-wheel part connected fixedly in terms of rotation to the latter;
   wherein a hollow intermediate shaft, through which the drive shaft extends axially, is provided;
   wherein each of a further free-wheel part of the first free-wheel and a free-wheel part of the second free-wheel is connected fixedly in terms of rotation to the intermediate shaft,
   wherein a further free-wheel part of the second free-wheel is connected fixedly in terms of rotation to the rotor of the electric motor so that, according to a free-wheel principle, each of the free-wheel parts free-wheel drives the other in one direction of relative rotation and does not drive the other in an opposite direction of relative rotation, and wherein the liquid pump is arranged so as to surround the drive shaft coaxially.

3. The motor vehicle drive arrangement according to claim 1, wherein the second free-wheel is arranged so as to surround the drive shaft coaxially.

4. The motor vehicle drive arrangement according to claim 1, wherein the electric motor is arranged so as to surround the drive shaft coaxially.

5. The motor vehicle drive arrangement according to claim 4, wherein the electric motor at least partially overlaps the liquid pump axially in a radially outer region of the liquid pump.

6. The motor vehicle drive arrangement according to claim 1, wherein the first free-wheel is arranged on an inner circumference of the intermediate shaft and the second free-wheel is arranged on an outer circumference of the intermediate shaft.

7. The motor vehicle drive arrangement according to claim 1, wherein the intermediate shaft is mounted on the drive shaft so as to be rotatable relative to the drive shaft.

8. The motor vehicle drive arrangement according to claim 1, wherein the drive train contains at least one electrical machine which can be operated as an electric motor in order to introduce, into the drive train, drive energy for driving the motor vehicle, and which, in combination with the locomotive drive engine, forms a hybrid drive.

9. The motor vehicle drive arrangement according to claim 8, wherein the electrical machine is arranged coaxially around the drive shaft and is drive-connected or drive-connectable to the drive shaft.

10. The motor vehicle drive arrangement according to claim 1, wherein the locomotive drive transmission is an automatic transmission.

11. The motor vehicle drive arrangement according to claim 1, wherein the locomotive drive engine is an internal combustion engine.

12. The motor vehicle drive arrangement according to claim 11, wherein a drive-train input shaft capable of being driven by the locomotive drive engine is drive-couplable to the drive shaft via a clutch device, the clutch device being arranged coaxially to the center axis of the drive shaft and annularly surrounding this center axis.

13. The motor vehicle drive arrangement according to claim 1, and further comprising a control device by which, when the rotary part is at a standstill or is rotating slowly, either as a result of the standstill or crawling of the motor vehicle, the electric motor is automatically switched on simultaneously or with only a little delay during starting of the locomotive drive engine for supply of liquid to the at least one drive part.

14. The motor vehicle drive arrangement according to claim 2, and further comprising a control device by which, when the rotary part is at a standstill or is rotating slowly, either as a result of the standstill or crawling of the motor vehicle, the electric motor is automatically switched on simultaneously or with only a little delay during starting of the locomotive drive engine for supply of liquid to the at least one drive part.

15. The motor vehicle drive arrangement according to claim 3, and further comprising a control device by which, when the rotary part is at a standstill or is rotating slowly, either as a result of the standstill or crawling of the motor vehicle, the electric motor is automatically switched on simultaneously or with only a little delay during starting of the locomotive drive engine for supply of liquid to the at least one drive part.

16. The motor vehicle drive arrangement according to claim 4, and further comprising a control device by which, when the rotary part is at a standstill or is rotating slowly, either as a result of the standstill or crawling of the motor vehicle, the electric motor is automatically switched on simultaneously or with only a little delay during starting of the locomotive drive engine for supply of liquid to the at least one drive part.

17. The motor vehicle drive arrangement according to claim 2, wherein the drive train contains at least one electrical machine which can be operated as an electric motor in order to introduce, into the drive train, drive energy for driving the motor vehicle, and which, in combination with the locomotive drive engine, forms a hybrid drive.

18. The motor vehicle drive arrangement according to claim 3, wherein the drive train contains at least one electrical machine which can be operated as an electric motor in order to introduce, into the drive train, drive energy for driving the motor vehicle, and which, in combination with the locomotive drive engine, forms a hybrid drive.

19. The motor vehicle drive arrangement according to claim 4, wherein the drive train contains at least one electrical machine which can be operated as an electric motor in order to introduce, into the drive train, drive energy for driving the motor vehicle, and which, in combination with the locomotive drive engine, forms a hybrid drive.

20. The motor vehicle drive arrangement according to claim 2, wherein the locomotive drive engine is an internal combustion engine.

21. The motor vehicle drive arrangement according to claim 3, wherein the locomotive drive engine is an internal combustion engine.

22. The motor vehicle drive arrangement according to claim 4, wherein the locomotive drive engine is an internal combustion engine.

* * * * *